March 14, 1961 E. C. H. VOIGTLANDER 2,974,918
UNIVERSAL BRACKET SUPPORT
Filed July 3, 1957 3 Sheets-Sheet 2
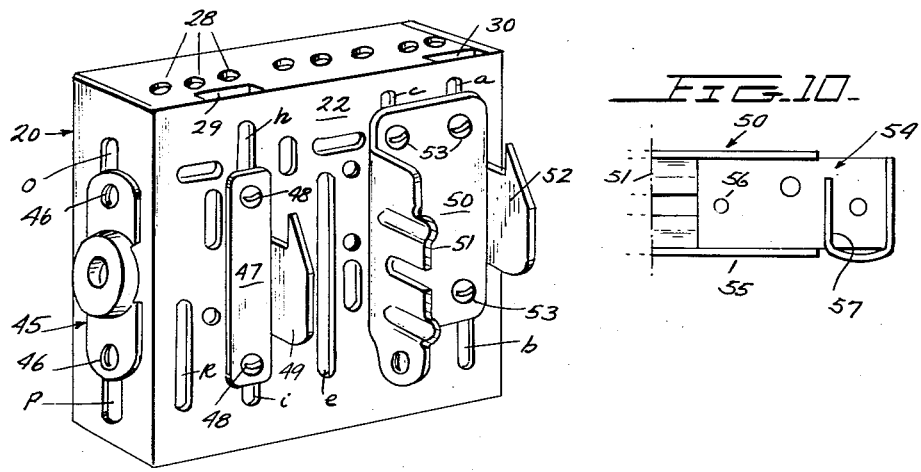
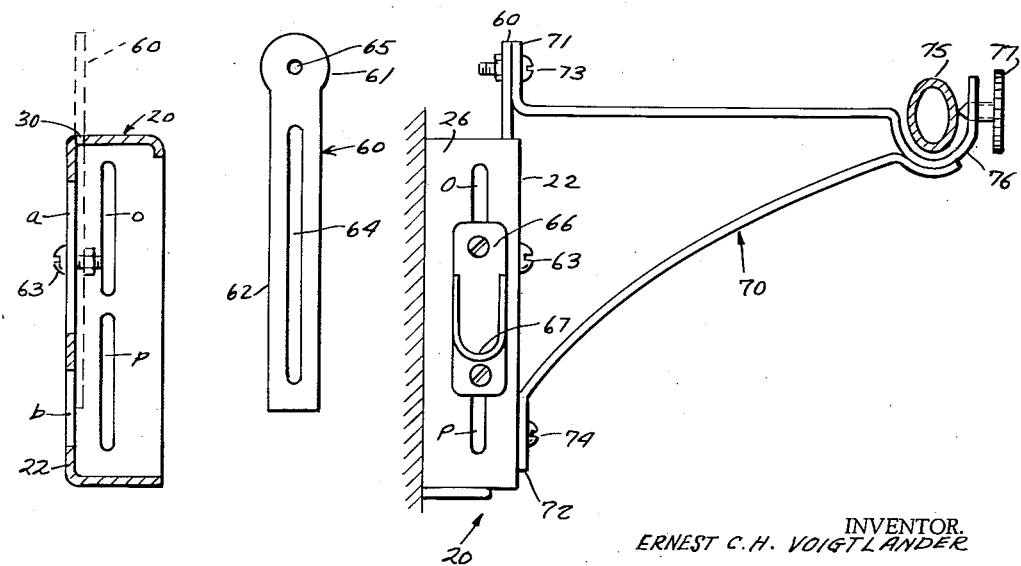
INVENTOR.
ERNEST C.H. VOIGTLANDER March 14, 1961 E. C. H. VOIGTLANDER 2,974,918
UNIVERSAL BRACKET SUPPORT
Filed July 3, 1957 3 Sheets-Sheet 3
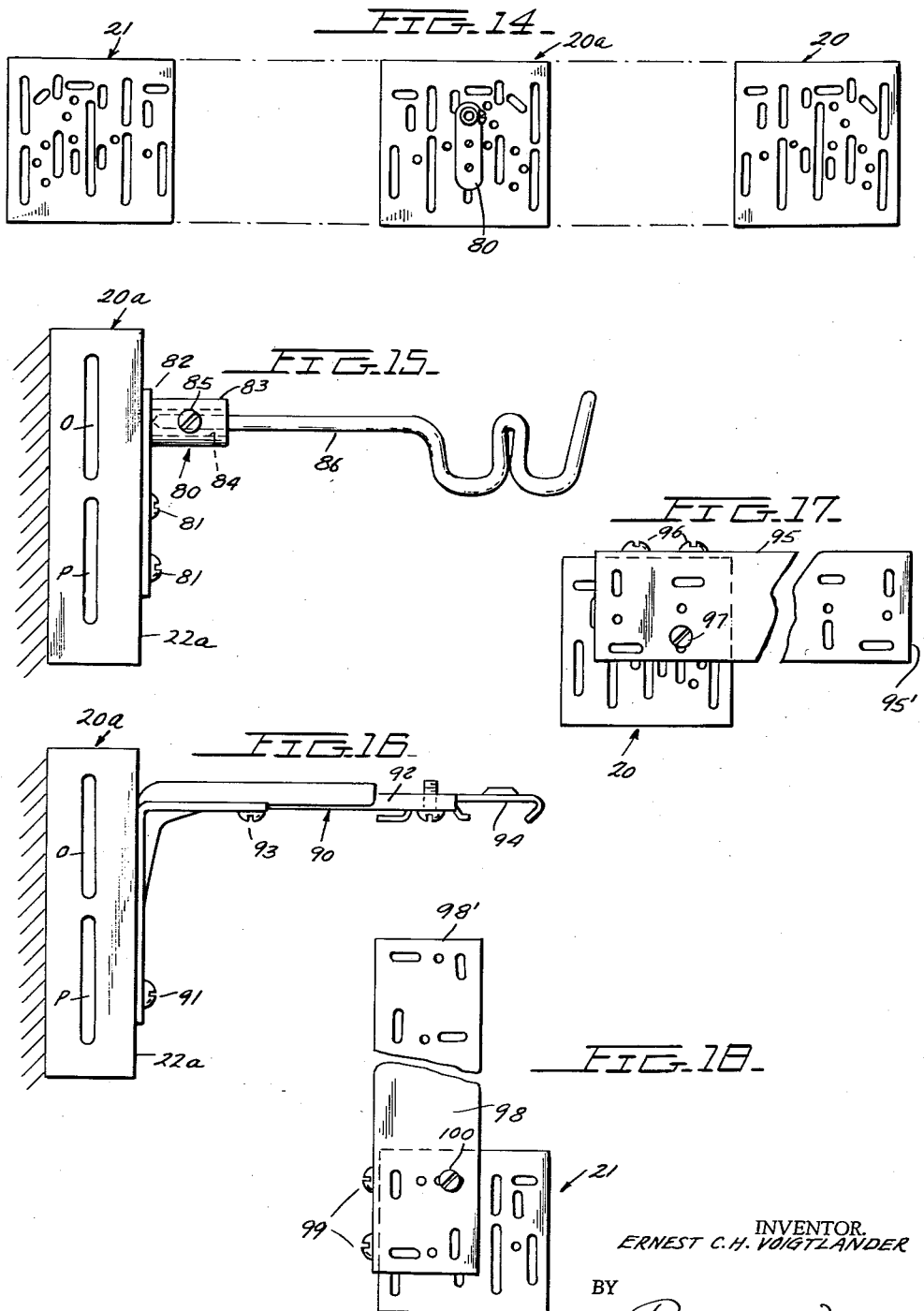
INVENTOR.
ERNEST C. H. VOIGTLANDER
BY
Richard A. Mawn

United States Patent Office 2,974,918
Patented Mar. 14, 1961

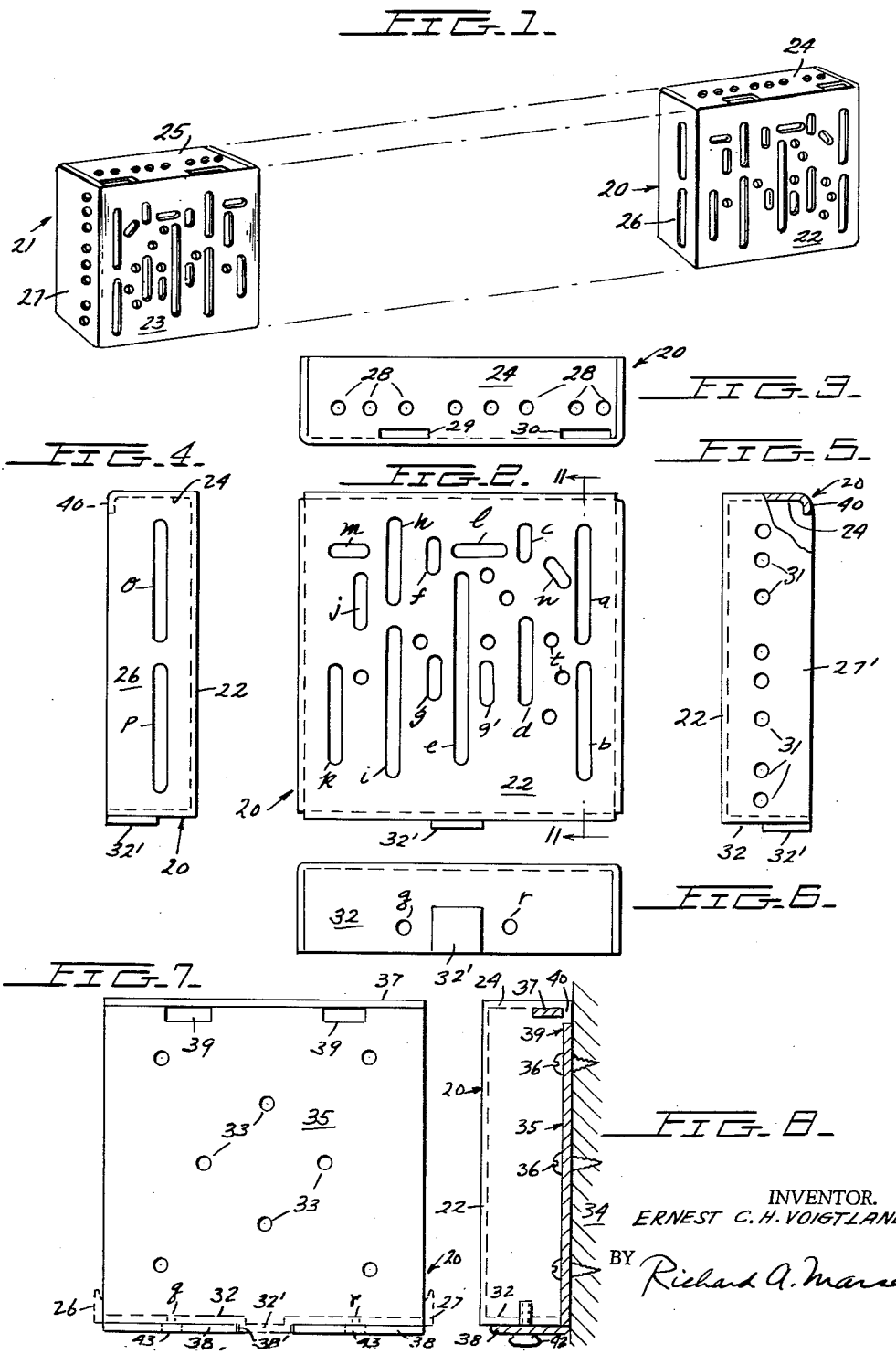

2,974,918
UNIVERSAL BRACKET SUPPORT

Ernest C. H. Voigtlander, Box 323, Laurel Drive, Highlands, N.J.

Filed July 3, 1957, Ser. No. 669,800

10 Claims. (Cl. 248—201)

The present invention relates generally to the art of supporting plural hangings for windows, doorways, etc. including shades, curtains, cornices, draperies, and like. The herein invention is primarily directed to providing novel universal support brackets for mounting various types and sizes of a plurality of brackets and fixtures utilized for the aforesaid purpose.

In accordance with the present invention, I provide a novel set of bracket supports upon which any conventional type and construction of bracket or mounting for the following items may be directly and readily supported: rods, poles, shades, blinds, including Venetian blinds, rings, pleaters, as well as extender plates, extender rods, cornices, angles, etc. The bracket supports of this invention are not limited to particular sizes, shapes or constructions of the auxiliary brackets for the various mountings. Generally, my universal support brackets are arranged in pairs, with the right and left brackets being symmetrical to each other. Where a rather large width is to be traversed, a third central universal bracket, corresponding for example to the right support bracket, is used additionally with suitable fixtures to be described. Further, fourth or fifth intermediate bracket supports may be used for centrally supporting unduly wide hangings.

In home and office decoration of windows, doorways, etc. it has heretofore been requisite to nail or screw specific sets of brackets for the various hangings as used, and as changed through the seasons or for style. This resulted in excessive damage to plaster or wood trim about the windows or doors, weakening the mounting of such special brackets, from season to season. Other than the weakening and destruction of the mounting areas for such specific bracket sets, it was a tedious task to remove these old brackets and remount new brackets directly upon their wall or frame areas. It is of course impossible to design or impractical to make a single bracket construction which could be used for hanging or support of all the various hanging units as to size, shape and type. Accordingly, the prior art utilized specialized brackets often with specific adjustments for the various uses referred to, and to be set forth in more detail.

It is an important object of the present invention to provide universal bracket supports which are readily mountable on the wall or frame about a window or doorway, which universal bracket supports or support brackets readily mount a plurality of sets of specific brackets for any requisite hanging array. As hangings, rods, poles, etc. generally are supplied with their requisite special brackets, my universal supports are used directly with them. Such special bracket sets are readily oriented in desired relationships on the invention universal bracket supports, and are readily removable and replaceable. The specific bracket sets mounted on the universal brackets hereof are thereupon readily mounted as groups on the wall or frame, and also readily demountable, necessitating no further securement to the building structure once the invention universal support base is initially affixed.

The universal support brackets of my invention have a mounting plate that is nailed or secured by screws to the wall or frame, and upon which the universal support brackets per se is readily attached or demounted. The invention universal brackets have slots, openings and other means for readily securing individual specialized brackets thereto in varied arrangements. A right-hand and left-hand support bracket are generally mounted adjacent the top corners of the window, doorway, or area to be decorated.

The universal support brackets of the invention have series or coordinated vertical slots and apertures to accommodate corresponding right-hand and left-hand specialized brackets for a variety of hangings. The invention supports have a coordinated aperture and slotted array on their respective faces, as well as on their sides. Further, extension arms are utilized with the invention universal brackets for accommodating specialized mountings that are wider than the vertical dimension of the face thereof. A third universal support bracket is mounted intermediate the right-hand and left-hand universal brackets for central support of hangings that are unduly wide or heavy and require central support. In such event the three universal brackets, and their slot aperture array, are coordinated for the specialized purposes as required in wide or heavy hangings, as will be detailed hereinafter in connection with Figs. 14, 15 and 16.

The invention universal support brackets are relatively inexpensive for the very advantageous and practical results which they attain. Together with the usually supplied special brackets, they constitute the complete hanging arrangements. The universal brackets of the invention are relatively small and light in weight, and are readily hidden amongst the hangings without projecting therefrom. They are relatively shallow and inconspicuous, and where desired may readily blend with the color of the wall, frame or hangings when suitably painted. They are easy to use even for complex hanging requirements.

It is accordingly an object of the present invention to provide novel universal bracket supports for selective mounting of one or more sets of specialized brackets for hangings.

Another object of the present invention is to provide a pair of universal support brackets each having an array of coordinated slots and apertures for selective mounting of one or more pairs of specialized brackets for hangings for a window or doorway.

Still another object of the present invention is to provide novel universal bracket supports for accommodating specialized hanging bracket pairs of wide diversity of size, type and function.

A further object of the present invention is to provide a novel universal support bracket having longitudinal slots and apertures on its face and sides for coordinated support of a variety of specialized hanging brackets.

Still a further object of the present invention is to provide a novel universal bracket arrangement incorporating coordinated slots and apertures in conjunction with an extension arm for accommodating specialized hanging brackets with mounting positions longer than the face of the universal bracket.

Still another object of the present invention is to provide relatively small and inconspicuous universal support brackets that readily harmonize with the hangings and mounting areas.

Another object of the present invention is to provide universal support brackets for mounting a plurality of sets of specific hanging brackets that are relatively light in weight, inexpensive to fabricate and simple to use.

These and further objects of the present invention will become more apparent in the following description of exemplary embodiment thereof, taken in conjunction with the drawings in which:

Fig. 1 is a perspective illustration of the right-hand and left-hand exemplary universal support brackets.

Fig. 2 is a plan view of the face of the right-hand exemplary support bracket.

Fig. 3 is a top view of the support bracket of Fig. 2.

Fig. 4 is a left side view of the support bracket of Fig. 2.

Fig. 5 is a right side view of the Fig. 2 universal bracket.

Fig. 6 is a bottom view of the support bracket of Fig. 2.

Fig. 7 is a plan view of the mounting plate for the universal bracket of Fig. 2.

Fig. 8 is a cross-sectional view through the bracket support of Fig. 7, taken along the line 8—8 thereof.

Fig. 9 is an enlarged perspective illustration of the exemplary universal bracket support, with three specialized hanging brackets supported thereon.

Fig. 10 is a side elevational view of a portion of one of the hanging brackets of Fig. 9.

Fig. 11 is a cross-sectional view through the universal support bracket of Fig. 2, taken along the line 11—11 thereof.

Fig. 12 is a plan view of an extension arm for use in conjunction with the universal support brackets of Figs. 1 to 11.

Fig. 13 illustrates the mounting of a specialized bracket that is wider than the basic universal support bracket, in conjunction with an extension arm.

Fig. 14 illustrates the invention universal support brackets used for additional central mounting of hangings.

Fig. 15 is an end view of the central universal support bracket of Fig. 14, with a central bracket thereon and a lateral extension fixture.

Fig. 16 illustrates the central universal bracket with an adjustable traverse rod center support.

Figs. 17 and 18 illustrate the mounting of an extender plate in horizontal and vertical orientation respectively on the invention universal support bracket.

Fig. 1 illustrates the exemplary universal support brackets 20, 21 as mounted along a plane in horizontal alignment upon a wall or frame (not shown). The universal bracket supports 20, 21 each have a mounting face 22, 23, respectively, and a series of coordinated vertical slots and apertures in the manner and for the purposes to be described. It is stated at this point that the array of apertures and slots of the left-hand universal bracket 21 is symmetrical on a mirror symmetry basis to that of bracket 20. In this manner the units 20, 21 respectively support right-hand and left-hand specialized hanging brackets in the manner to be described.

Units 20, 21 are preferably of box-like form. The top sides 24, 25 of the respective units 20, 21 are also in symmetry, and contain apertures and slots for purposes to be set forth hereinafter. The interior sides corresponding to 26 of unit 20, and the symmetrical one for unit 21 (not shown), are for mounting such brackets as for window shades, blinds, etc., and have vertical aligned slots for this purpose. The outer end surfaces, corresponding to 27 of unit 21, each have a vertical array of apertures.

Figs. 2 to 6 are respective face and end view of the right-hand universal support bracket 20. The corresponding views of the left-hand bracket 21 are similar, except for the mirror symmetry mentioned above. The mounting face 22 of universal support bracket 20 has a series of parallel coordinated vertical slots spaced from edge to edge of face 22. The long slots $a$, $b$ are coordinated for mounting of a hanging bracket in vertical disposition, and permitting its adjustment up and down along slots $a$ and $b$ in its fastening as by bolts to plate 22.

A further pair of vertical aligned slots $c$, $d$ are spaced from slots $a$, $b$, and are also used for such mounting wherein bolts pass through these slotted openings and the specialized brackets, and wherein nuts coact with their bolts at the interior of the bracket 20. Additional vertical slots are arranged in an array from $e$ through $k$, spaced and coordinated with corresponding slots in companion unit 21 and for the purposes to be set forth. A pair of small horizontal slots $l$ and $m$ are arranged near the top of face 22. A diagonal slot $n$ appears between vertical slots $a$ and $c$. Also, a series of individual apertures $t$ are spread between the various slots $a$ through $m$.

The purpose of these coordinated slots and apertures is to readily mount a plurality of hanging brackets of various commercial types and sizes. The respective mounting holes of the specialized brackets are fitted to the array apertures and slots. Despite such array rigidity and strength of face 22 of the universal bracket is retained. The width of the slots $a$ to $n$, and the diameter of apertures $t$ of face 22, as well as those on the ends faces of the bracket 20, preferably correspond to easily pass through a standard bolt size, as for example No. 6–32.

Fig. 3 is the top view, showing top face 24 of universal support bracket 20. The top face 24 contains a linear series of openings or apertures 28, 28 regularly spaced and grouped for mounting of specialized units such as extender plates will be described in more detail in connection with Figs. 17 and 18. A pair of slots 29, 30 are arranged across face 24, positioned just behind face 22. Extension arms project and mount through slots 29, 30 when utilized with the universal bracket 20 in the manner set forth in connection with Figs. 11, 12 and 13.

Fig. 4 is the "inside" vertical side 26 of support bracket 20, having a pair of aligned vertical slots $o$ and $p$. The slots $o$ and $p$ are generally used for "inside" hanging brackets, such as for window shades, Venetian blinds curtain rods, etc. as illustrated in Figs. 9 and 13. The opposite vertical end 27' of universal bracket 20 (Fig. 5) has a vertical array of apertures 31, 31 similar to those along top face 24 and for the same purpose. The bottom end 32 of universal bracket 20 (Fig. 6) has a pair of spaced threaded apertures $q$, $r$ for use in mounting support bracket 20 upon its mounting plate 35 as described in connection with Figs. 7 and 8. A projection 32' from face 32 is used to interlock with the support mounting base (see Fig. 7) to avoid side sway.

Figs. 7 and 8 illustrate the mounting plate 35 used for ready mounting and demounting of the universal support brackets 20, 21. The plate 35 is fixedly mounted to the wall, window, door frame or the like, by nails, screws or other suitable means through openings 33, 33 thereof. The mounting plate 35 is flat and directly mounted to the wall or frame 34, as shown in Fig. 8 with screws 36. The universal support bracket 20 interlocks with mounting base 35 to avoid side displacement, yet be effectively mounted on the wall or frame.

In Fig. 7 the dotted representation of bracket 20 is shown with projection 32' seated in slot 38 in flange 38 extending from plate 35. The lips 40 depending from support 20 and 24 are inserted into cut-outs 39, 39 in top of plate 35. The bottom end 32 seats on top of flange 38 of plate 35 as seen in Fig. 8. In this manner, the bracket support 20 rests upon flange 38, and interlocks therewith for a rigid and well-supporting mount. In this manner heavy hangings can be readily accommodated by the invention bracket supports. The plate 35 is simple to fabricate, easy to mount on wall 34 through holes 33 with nails or screws 36. The box-like support 20 is readily mounted on plate 35 through the depending lips 40 and projection 32' and rests on both flanges 37, 38 of plate 35. The support 20 and plate 35 are interlocked against displacement, and are joined and locked by thumb screws 42 through flange openings 43 and threaded apertures $q$, $r$. It is to be understood that alternate and equivalent securements for the invention universal support brackets 20, 21 to mounting plate 35 may be utilized within the scope of the invention.

Fig. 9 illustrates a typical plural use for the universal support bracket assembly of the present invention. The right-hand bracket 20 is illustrated in enlarged perspective, with a window shade bracket 45 secured along the vertical "inside" edge 26 slots o and p. It is to be realized that the longitudinal slots such as o and p permit vertical alignment and positioning for the hanging brackets secured thereto. It is to be understood, further, that in the corresponding left-hand bracket 21, the "inside" face thereof corresponding to face 26 of bracket 20 has the complementary hanging bracket to 45 mounted at the same relative position along the vertical slots, in order that the two window shade brackets hold the shade horizontally.

The window shade bracket 45 is mounted through apertures thereof with bolts 46, 46 against end 26 of bracket 20 and through the slots o and p. A conventional hook-arm curtain rod bracket 47 is shown mounted along channels h, i, of the universal bracket 20 by bolts 48, 48. The curtain rod bracket 47 has a lateral extension 49 in the usual manner, projecting from the body of the bracket 47. The vertical alignment of the bracket 47 is accomplished by orientation along the longitudinal slots h, i. A right-side curtain rod bracket 47 is shown mounted on the right-side universal support bracket 20; it being understood that a corresponding left-side curtain rod bracket is mounted on the counterpart universal support bracket (21) for the horizontal hanging of the curtain rod therefor.

A further specialized bracket 50 is also shown mounted on the universal bracket 20 of Fig. 9. The specialized bracket 50 is a combination of traverse bracket (extending as adjustable projecting arm 51, see Fig. 10), and a valance rod bracket 52. The composite bracket 50 is secured by three bolts 53, 53 respectively engaged with vertical slots a, b, and c. The protruding adjustable arm of bracket 50 is shown cut-off at the dotted portion in Fig. 9 for the sake of clarity of presentation, Fig. 10 denoting the remaining portion 51 that extends from combination hanging bracket 50. It is noted that the combination bracket 50 is mounted adjustably in the vertical direction along the slots a, b and c. Also, the traverse rod bracket portion 54 thereof is adjustable outwardly along the rail portion 55, 55 of bracket arm 51, and locked by machine screw 56 in the desired extended position. The cup-like portion 57 at the end of arm 54 is for holding the end of the traverse rod, as will be understood by those skilled in the art.

The bracket assembly of Fig. 9 accordingly illustrates the adjustable mounting of four different and correlated hanging means, namely the window shade bracket 45, the curtain rod bracket 47, and the combination traverse rod and valance rod bracket 50. It is to be understood that the complementary left-side brackets to these are mounted in the mirror-symmetrical universal bracket 21 at the left-side of the window frame, as per Fig. 1. It is also to be understood that different brackets and positioning thereof may be coordinated on the universal support brackets 20, 21 of the invention.

Figs. 11, 12 and 13 illustrate an auxiliary aspect of the invention support brackets. The cross-sectional Fig. 11, vertically through the universal bracket 20, shows slot 30 through which an extension arm 60 is mountable. Fig. 12 illustrates extension arm 60, having a wider head 61 than body 62. Body portion 62 slides through the slot 30. A nut and bolt 63 indicates in Fig. 11 how arm 60 is secured in a desired vertical position along support slot a by the bolt 63. The bolt passes through the slot a (or b) at face 22 of support bracket 20, and through the vertical slot 64 of the arm 60.

The horizontal slot 30 in support bracket 20 is adjacent the back of face plate 22, and presents a mounting support for the arm 60. The aperture 65 at the exterior of arm 60 is for the mounting of external specialized hanging brackets, as shown in Fig. 13. Alternatively the other slot position 29 of bracket support 20 may be used in place of end slot 30, in conjunction with corresponding vertical slots on face 22 for adjustable mounting of extension arm 60. Further, two extension arms corresponding to 60 may be used together with the universal support bracket 20 for supporting two wider based specialized brackets, in a manner of Fig. 13.

In Fig. 13 two hanging brackets are illustrated mounted upon the universal bracket support 20. A rod-support bracket 66, having a U-shaped member 67 in which the end of a rod is positioned, is arranged along the vertical slots o, p of "inside" face 26 in the manner of window shade bracket 45 of Fig. 9. Other "inside" type of brackets may instead be used, such as for Venetian blinds, etc. The drapery or pole rod bracket 70 has support feet 71, 72 which span to a wider extent than the basic height of mounting face 22 of the universal bracket 20.

For the support of bracket 70 the extension arm 60 is inserted and mounted with the universal bracket 20, in the manner of Fig. 11. The upper mounting leg 71 of pole bracket 70 is secured through the top opening 65 of bracket 60 by bolt 73. The lower mounting leg 72 is secured to a suitable aperture or slot on face 22 of universal bracket 20 by bolt 74. The extension arm 60 is secured within slot 29 or 30 of the universal bracket 20 by bolt 63. The large based pole-bracket 70 thus has ample leverage, and is rigidly held in position for supporting even a heavy pole 75, a hollow brass rod herein for carrying a drapery. The pole end 75 is placed in cup-shaped portion 76, and fastened therein by knurled screw 77.

It is clear that an additional "too-wide" based hanging bracket, corresponding to pole bracket 70, may be mounted on a single universal bracket 20 by the use of a second extension arm corresponding to 60 through the respective slots 29 (or 30) in the top of face 24 thereof. It is also apparent that a too-wide based bracket, as well as other specialized hanging brackets corresponding to those shown in Fig. 9, or otherwise known to those skilled in the art, may be compositively mounted in plural fashion upon each of the companion universal support brackets 20, 21.

Where the hanging is extra wide or unduly heavy an additional central support is generally indicated. The proper and flexible securement of such central support has in the past been a big problem. With the universal support brackets of the present invention a ready solution is provided therefor. Fig. 14 indicates one central universal support bracket 20a located between outer universal support brackets 20 and 21 as per Fig. 1. Two or more intermediate bracket supports as per 20a may be used between end supports 20, 21. In Fig. 14 the central bracket 20a is identical to that of the right-hand universal bracket 20. However it may be the left-hand one, if desired.

Mounted on central backet 20a is a center-post bracket 80. Fig. 15 illustrates the center-post bracket 80 secured to universal bracket 20a through appropriate apertures or slots thereof by bolts 81, 81. The post bracket 80 comprises a plate 82 arranged against face 22a of universal bracket 20a, and has a tubular extension 83 with a central aperture 84 therethrough. Accordingly, the center post 83 projects perpendicularly from the plane of the universal brackets 20, 20a and 21, and therefor the wall thereof, and has an aperture 84 through which extension members for center supporting are mounted.

In Fig. 15 a curtain rod center-support 86 is secured in the center-post bracket 80 through aperture 84 thereof and screw 85. In Fig. 16 a traverse rod center support bracket 90 is mounted directly on the face 22a of the central universal bracket 20a by bolts 91. The traverse rod center support 90 is adjustable in a plane perpendicular to that of face 22a by an arm 92 slidable in a channel of bracket 90, and secured in the adjusted position by screw 93. The channel 94 at the end of bracket 90 is the traverse rod support. It is to be understood that the center bracket support 20a may be used for several simultaneous hangings, as brackets 86 and 90 together.

Figs. 17 and 18 illustrate the securement of extender plates on the respective universal brackets 20 and 21. Extender plate 95 is bolted to the right-hand universal support bracket 20 in Fig. 17 through suitable top bolts 96, 96 and a face bolt 97. The extender plate 95 is of the usual construction, permitting the mounting of brackets at its extended end 95′, remote with respect to the universal bracket 20. Plate 95 is mountable in several positions thereon. Fig. 18 shows a left-hand bracket 21 mounting an extender plate 98 in the vertical extension position by bolts 99, 100. Securement of the additional brackets to the top portion 98′ extends the effectiveness of the fixed support bracket 21.

The universal support brackets of the present invention may be used in various additional practical and advantageous ways. For example cornices, valances, and festoon boards may be affixed directly to the universal brackets 22, 23 along their respective top portions 24, 25, see Fig. 1. Such items may thus be bolted to the brackets 22, 23 through suitable openings 28 (Fig. 3), and the brackets thereupon affixed on their respective mounting plates in the manner of Fig. 8. Similarly, drapery rods or drapery cranes may be secured directly to the vertical faces of the respective universal brackets 22, 23, through suitable slots and apertures thereof. Further, valance pleaters used in adjusted position for center support may also be used.

While I have illustrated and described a preferred form for my invention, and exemplary modes and uses thereof, it is to be understood that variations and modifications in the structure and use thereof, may be made without departing from its broader spirit and scope as defined in the appended claims.

I claim:

1. A pair of universal bracket supports adapted for spacedly mounting pairs of hanging brackets of various types for respective hangings across a wall area, the hanging brackets each having at least two spaced mounting apertures, the bracket supports being adapted to be attached to the two upper corners of a wall area, said bracket supports each comprising a box-like frame with a face plate mountable parallel to the wall area and having openings composed of a plurality of parallel spaced slots and a plurality of apertures interspread among the slots, the width of the face plate slots and apertures being comparable in size to that of the hanging bracket apertures whereby a plurality of pairs of hanging brackets are simultaneously securable to said face plates in normal vertical array with bolts through the bracket apertures and the face plate openings and a mounting plate securable to each of the said wall area corners and interlockable with each said box-like frame to thereby removably mount said frames on the wall area.

2. A pair of universal bracket supports adapted for spacedly mounting pairs of hanging brackets and fixtures of various types for respective hangings across a specific wall area, the hanging brackets and fixtures each having at least two spaced mounting apertures, the bracket supports being adapted to be attached to the two upper corners of a wall area, said bracket supports each comprising a box-like frame with a face plate mountable parallel to the wall area and having openings composed of a plurality of parallel spaced vertical slots, at least one cross-slot subtending two spaced vertical slots and a plurality of apertures interspread among the slots, the width of the face plate slots and apertures being comparable in size to that of the hanging bracket apertures whereby a plurality of pairs of hanging brackets and fixtures are simultaneously securable to said face plates in normal vertical array with bolts through the bracket aperture and the face plate openings, said box-like frames containing means consisting of a plurality of apertures in their outer side plates arranged for securing a hanging bracket pair in spaced operative relation across the wall area.

3. A pair of universal bracket supports adapted for spacedly mounting pairs of hanging brackets and fixtures of various types for respective hangings across a specific wall area, the hanging brackets and fixtures each having at least two spaced mounting apertures, the bracket supports being adapted to be attached to the two upper corners of a wall area, said bracket supports each comprising a box-like frame with a face plate mountable parallel to the wall area and having openings composed of a plurality of parallel spaced vertical slots, at least one horizontal slot subtending two spaced vertical slots and a plurality of apertures interspread among the slots, the width of the face plate slots and apertures being comparable in size to that of the hanging bracket apertures whereby a plurality of pairs of hanging brackets and fixtures are simultaneously securable to said face plates in normal vertical array with bolts through the backet and fixture apertures and the face plate openings, the said face plate slots and apertures being respectively oriented in mirror image symmetry on the two bracket supports whereby the hanging brackets and fixtures pairs are mountable in coactable relation for supporting their respective hangings.

4. A pair of universal bracket supports as claimed in claim 3, in which the outside end plate of each of said box-like frames contains a line of spaced hanger bracket mounting apertures arranged parallel to its face plate.

5. A pair of universal bracket supports as claimed in claim 2, in which the top plate of each box-like frame contains a line of spaced hanger bracket mounting apertures arranged parallel to its face plate.

6. A pair of universal bracket supports as claimed in claim 3, in which the top plate of each box-like frame contains a slot parallel to and adjacent its associated face plate oriented above a vertical slot thereof, and a flat vertical extension arm securable to each frame through its top plate slot and a bolt through the associated vertical slot.

7. A pair of universal bracket supports as claimed in claim 6, further including a mounting plate for each frame arranged to be interlocked therewith.

8. A pair of universal bracket supports as claimed in claim 2, further including a mounting plate for each frame arranged to be interlocked therewith, the interlocking being established with a projection and slot engagement therebetween.

9. A pair of universal bracket supports as claimed in claim 3, further including a mounting plate for each frame arranged to be interlocked therewith, the interlocking being established with a projection and slot engagement therebetween comprised of a flange extending along the bottom edge of each mounting plate coacting with a slot in the associated frame.

10. A pair of universal bracket supports as claimed in claim 1, further including a lip extending from the top plate of each frame engageable with the top portion of its associated mounting plate to secure said frames against downward and transverse pressures.

References Cited in the file of this patent

UNITED STATES PATENTS

| | | |
|---|---|---|
| 1,657,017 | Lamberson | Jan. 24, 1928 |
| 2,480,438 | Bergman et al. | Aug. 30, 1949 |
| 2,498,068 | Chatfield | Feb. 21, 1950 |
| 2,733,786 | Drake | Feb. 7, 1956 |

FOREIGN PATENTS

| | | |
|---|---|---|
| 466,639 | Canada | July 18, 1950 |